(No Model.)
H. P. YOUNG.
TORPEDO STAFF.
No. 401,810. Patented Apr. 23, 1889.
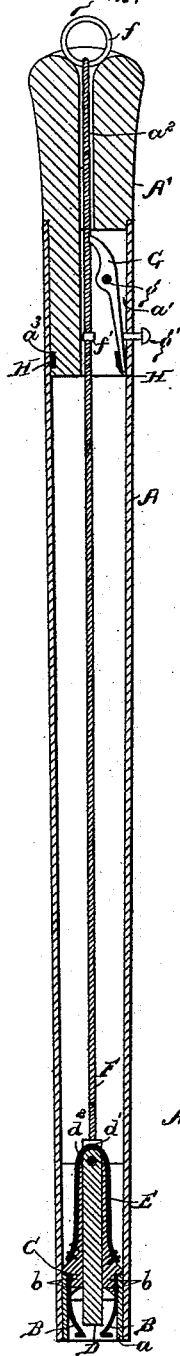
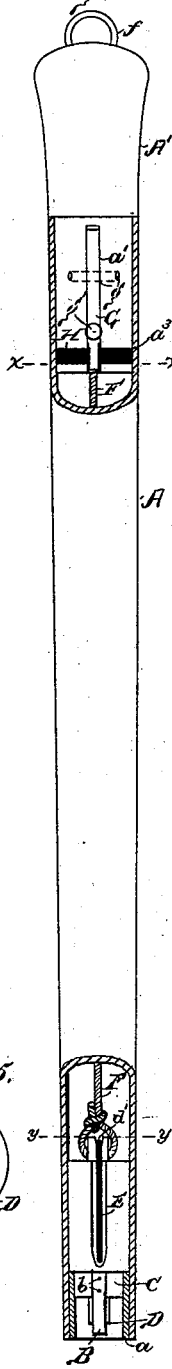
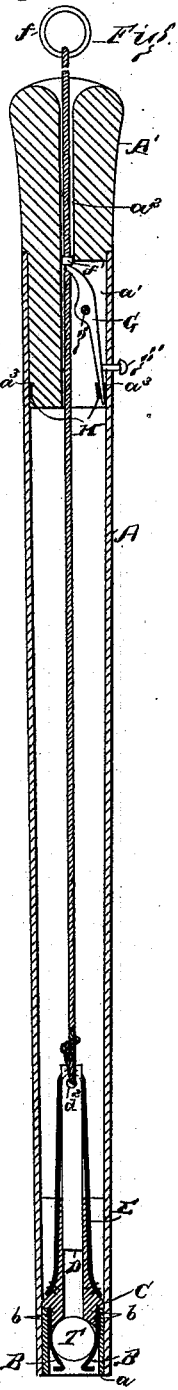
Witnesses
Kirkley Hyde.
Myrtie C. Beals.
Inventor
Harlan P. Young,
By Albert M. Moore,
His Attorney.
N. PETERS, Photo-Lithographer, Washington, D. C.

UNITED STATES PATENT OFFICE.

HARLAN P. YOUNG, OF LOWELL, MASSACHUSETTS, ASSIGNOR OF ONE-HALF TO JOSEPH L. PINDER, OF SAME PLACE.

TORPEDO-STAFF.

SPECIFICATION forming part of Letters Patent No. 401,810, dated April 23, 1889.

Application filed August 2, 1888. Serial No. 281,765. (No model.)

*To all whom it may concern:*

Be it known that I, HARLAN P. YOUNG, a citizen of the United States, residing at Lowell, in the county of Middlesex and Commonwealth of Massachusetts, have invented a certain new and useful Improvement in Torpedo-Staffs, of which the following is a specification.

My invention relates to torpedo-staffs, or staffs which, besides serving the purpose of walking sticks or batons or other purposes, are adapted to discharge torpedoes; and it consists in the devices and combinations hereinafter described and claimed.

In the accompanying drawings, Figure 1 is a side elevation of a cane or walking-stick constructed according to my improvement, the upper and lower ends of the body or barrel of the cane being in central section to show the construction; Fig. 2, a central vertical section of the cane, showing the striker in its lowest position; Fig. 3, like Fig. 2, except that the striker is in a raised position, the plane of the sections in Figs. 2 and 3 being at right angles to the plane of the section shown in Fig. 1; Fig. 4, a horizontal section on the line $x\,x$ in Fig. 1; Fig. 5, a plan of the cane inverted; Fig. 6, a horizontal section on the line $y\,y$ in Fig. 1.

A is the body or barrel of the cane, and is preferably a downwardly-tapering tube of any suitable material, preferably paper, strengthened at its lower end by a sleeve, $a$, or bushing of metal. Within the recess or opening of the sleeve $a$ is placed the torpedo, which may be retained in said recess merely by friction; but I prefer to arrange in said recess one or more leaf-springs, B, substantially of the form shown, their upper ends being secured at the sides of the recess and their lower ends being curved inward to reach under a torpedo, T, and retain the same in said recess. The springs B are flexible enough to allow a torpedo to be pushed upward past their lower ends. The upper ends of the springs B are secured by nails or rivets $b$ to the outside of a tubular plug, C, inserted in the barrel A above the sleeve $a$. Within the central opening of the plug C slides the striker D, the same being a pin, preferably cylindrical, and forced downward into the recess of the sleeve $a$ by a spring, E, which is preferably a strip of rubber, the ends of which are secured by tacks $e$ or staples driven into said plug on opposite sides thereof, the plug being grooved to admit the rubber spring, and the spring passing over the top of the striker, the striker being provided in its upper end with a notch, $d'$, to receive the spring. Through a hole, $d^2$, in the striker D, near the top of the same, is passed a wire or cord, F, which is then tied securely to the striker. The cord F reaches through the top or head A' of the cane, and has secured to its upper end a button or ring, $f$, to prevent the upper end of the cord from dropping down into the barrel.

If the striker be raised by drawing up the cord F and then let go, it will be thrown downward suddenly by the action of the spring E, throwing the lower end of the striker into the recess or opening of the sleeve $a$ with sufficient force to discharge a torpedo placed in said sleeve.

It is much more convenient to have some means of holding the striker up while the torpedo is being placed in the recess, so that both hands may be used for that purpose. I therefore provide the cord F with an enlargement, $f'$, which may be simply a knot tied in the cord or a metallic collar pinched onto the cord with sufficient force to prevent the collar from moving on the cord, and I arrange a catch, G, to engage the enlargement on the cord and prevent any downward movement of the same. The catch G is a lever pivoted at $g$ within a radial slot, $a'$, formed in the head A', said head being preferably a plug of wood, solid except for said slot and a central hole, $a^2$, through which the cord is passed. The upper end of the catch G is held in contact with the cord F by a spring, H, which is represented in the drawings as a band of elastic material surrounding the lower end of the head A within an annular groove, $a^3$, formed in said head, said band crossing the slot $a'$ between the bottom of the slot and the lower end of the catch G.

The lower end of the head A' is inserted in the top of the barrel A far enough to conceal the slot $a'$, and a stud, $g'$, projects from the lower arm of the catch G through an opening in the barrel, so that by pressing on this stud the upper end of the catch is thrown outward, releasing the cord, and allowing the striker to be thrown downward by the spring E, above described.

Obviously the striker might reach up through the top of the cane and the cord be dispensed with.

When the device is to be used for a baton, the barrel is preferably cylindrical and shorter than is required for a cane, but in other respects is the same as above described.

I claim as my invention—

1. The combination of the body or barrel provided with a recess in one end to receive a torpedo, one or more springs arranged in said recess to retain a torpedo therein, a striker, a spring to force said striker into said recess, a cord attached to said striker and provided with a knot or enlargement, a catch to engage said knot or enlargement to hold said striker out of said recess, and a spring to hold said catch in engagement with said knot or enlargement, as and for the purpose specified.

2. The combination of the body or barrel provided with a recess in one end to receive a torpedo, one or more springs arranged in said recess to retain a torpedo therein, a striker, a spring to force said striker into said recess, a cord attached to said striker and provided with a knot or enlargement, a catch to engage said knot or enlargement to hold said striker out of said recess, a spring to hold said catch in engagement with said knot or enlargement, and a stud projecting from said catch through an opening with which said body or barrel is provided to release said catch, as and for the purpose specified.

In witness whereof I have signed this specification, in the presence of two attesting witnesses, this 20th day of July, A. D. 1888.

HARLAN P. YOUNG.

Witnesses:
ALBERT M MOORE,
MYRTIE C. BEALS.